United States Patent [19]

Mehadji

[11] Patent Number: 4,825,092

[45] Date of Patent: Apr. 25, 1989

[54] PROCESS AND SYSTEM FOR THE RELATIVE POSITIONING OF TWO OPTICAL FIBERS WITH A VIEW TO FORMING AN OPTICAL LINK BETWEEN THEM

[76] Inventor: Kada Mehadji, Rue Ropartz Brelevenez, 22300 Lannion, France

[21] Appl. No.: 21,411

[22] Filed: Mar. 4, 1987

[30] Foreign Application Priority Data

Mar. 7, 1986 [FR] France ................. 86 03237

[51] Int. Cl.[4] ............................................. G01N 21/86
[52] U.S. Cl. .................................... 250/561; 250/227; 356/400
[58] Field of Search ....................... 250/227, 201, 561; 356/73.1; 350/96.1, 96.2, 96.21, 96.22, 400

[56] References Cited

U.S. PATENT DOCUMENTS

| 3,800,388 | 4/1974 | Borner et al. ................. 356/73.1 |
| 4,474,469 | 10/1984 | Abe .................................... 356/73.1 |
| 4,506,947 | 3/1985 | Tatekura et al. ................. 350/96.20 |
| 4,613,214 | 9/1986 | Brugger et al. ................. 350/96.21 |
| 4,660,972 | 4/1987 | Rossberg et al. ................. 356/73.1 |

FOREIGN PATENT DOCUMENTS 0131488 1/1985 European Pat. Off. .
2110412 6/1983 United Kingdom .

*Primary Examiner*—David C. Nelms
*Attorney, Agent, or Firm*—Pearne, Gordon, McCoy & Granger

[57] ABSTRACT

A process and system for the relative positioning of two optical fibers wtih a view to establishing an optical link between them is disclosed. According to the invention, an image is formed of each fiber on a screen and on said image on the screen is represented the contour of the fiber core, said contour being in its effective position. The contours of one of the fibers and the core thereof are displaced on the screen until the contour of said core is aligned with the contour of the core of the other fiber and said fiber is displaced until its image coincides with its contour. An application of this invention is for the connection of optical fibers to one another.

11 Claims, 5 Drawing Sheets

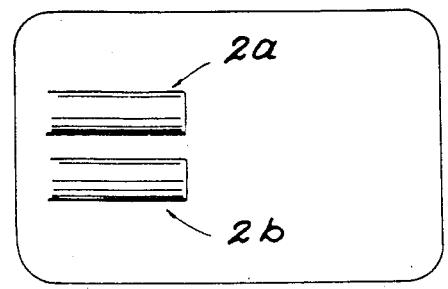
FIG. 4
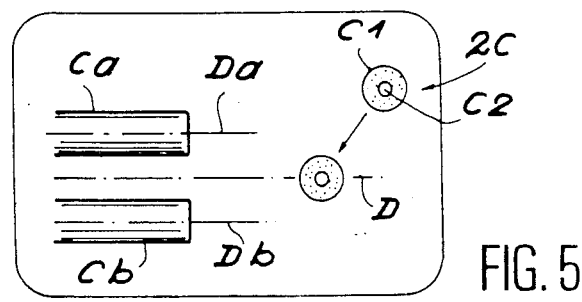
FIG. 5
FIG. 6
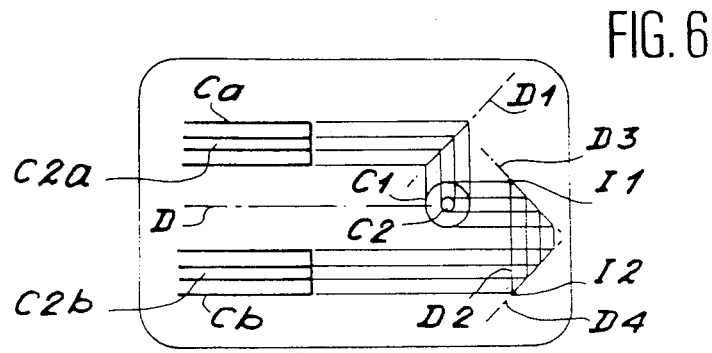
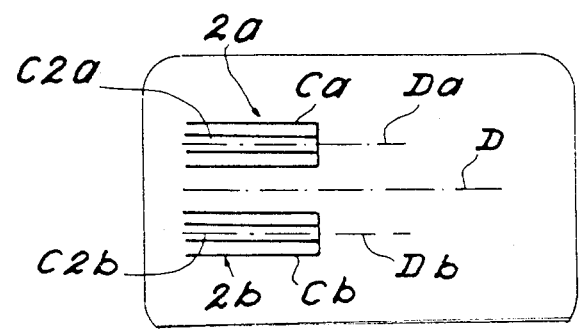
FIG 7

PROCESS AND SYSTEM FOR THE RELATIVE POSITIONING OF TWO OPTICAL FIBERS WITH A VIEW TO FORMING AN OPTICAL LINK BETWEEN THEM

BACKGROUND OF THE INVENTION

The present invention relates to a process and to a system for the relative positioning of two optical fibers with a view to establishing an optical link or connection between them. It can more particularly be used in the field of splicing or connecting optical fibers, e.g. by arc welding or a $CO_2$ laser. Moreover, the optical fibers considered in the present invention can be single-mode or multimode fibers.

It is known that the connection of optical fibers and in particular single-mode optical fibers is a difficult operation requiring highly skilled personnel.

Before carrying out said connection, it is necessary to align the fiber cores in as accurate a manner as possible (which is not easy in the case of single-mode fibers, whose cores generally have diameters less than 10 micrometers).

This connection can be brought about by placing the ends of the two fibers to be connected in the same V-shaped support, but such a procedure assumes the concentricity of the core and the covering of each fiber.

Another known procedure utilizes the optimization of the light energy coupling between the fibers to be connected, but this requires that the operator carrying out the connection has access to the other ends of the fibers, as well as an information return to said operator.

Two other known procedures make it possible to overcome the need to have access to the two ends of the fibers. One of these requires the use of a differential contrast microscope, which has very large dimensions and is therefore difficult to use other than in a laboratory. The second involves the use of the fluorescence of the core of the optical fibers and consequently only relates to germanium dioxide-doped fibers. When such fibers are irradiated with ultraviolet radiation, their core emits radiation which, appropriately treated, makes it possible to locate the core in each fiber and therefore align the two fibers.

SUMMARY OF THE INVENTION

The present invention relates to a process and a system for aligning two optical fibers not having the disadvantages of the procedures referred to hereinbefore, particularly as regards the fact that their users do not have to have access to the remote ends of the fibers to be connected, use relatively small equipment which is simple to use and can be used even if the fibers to be connected are cylindrical and have different external diameters, no matter what materials are used for forming the fibers and no matter what the shape or arrangement of the core of said fibers (eccentric core, oval core, etc.). Thus, unlike in the two last-mentioned known procedures referred to hereinbefore involving physical parameters of the fibers, the present invention only involves the geometrical parameters of the fibers, the location of the core in a fiber being obtained by geometrical image analysis. Another advantage of the present invention is that it can be carried out solely at the location where it is intended to connect the optical fibers.

More specifically, the present invention firstly relates to a process for the relative positioning of first and second optical fibers, with a view to establishing an optical link between them, wherein it comprises the following successive stages:

for each fiber, is formed on a screen at least one image of said fiber observed along at least one plane parallel thereto and on said image on said screen is represented the contour of the core of the fiber, the contour being in its effective position, on the screen, the contours of the second fiber and the core thereof are moved until the contour of the core is aligned with the contour of the core of the first fiber, and the second fiber is moved until its image coincides with the corresponding contour, i.e. is exactly inserted in its contour.

According to a preferred embodiment of the inventive process: for each optical fiber is formed on the screen images of the said fiber observed along two planes perpendicular to one another and parallel to the fiber, and on each of these images on the screen is represented the contour of the fiber core, said contour being in its effective position, the contours of the second fiber and its core are moved on the screen until the contours of said core are respectively aligned with the contours of the core of the first fiber, and the second fibre is moved until its images coincide with the corresponding contours.

For each fiber, the contour of its core on each image can be represented by firstly forming on the screen an image with the same magnification of the cross-sections of the fiber and the core thereof, by then displacing the contours of these sections until the contour of the core section is on the equidistant line distance of the respective median axes of the contour of the fiber and then carrying out on the screen to bending over or turning down operations to arrive at said contour in its effective position.

According to another embodiment of the inventive process, following the stage of moving the second fiber, whereby the two fibers then face one another, there is also a relative axial rotation of said fibers in order to increase the overlap of the cross-sections of the fibers and/or their cores, said sections facing one another. This "overlap" is obviously considered as being observed in orthogonal projection on a plane perpendicular to the thus aligned fibers.

This embodiment makes it possible to very accurately align fibers, whose cores are not cylindrical and optimize the coupling of eccentric core fibers, whilst improving the mechanical strength of the welds which may subsequently be made with a view to connecting the aligned fibers.

The present invention also relates to a system for the relative positioning of two optical fibers with a view to forming an optical link between them, respective ends of said fibers then being positioned facing one another, wherein it comprises:

fiber holding means, able to keep the fibers oriented in a given direction, whereby at least one of the holding means is displaceable, first observation means making it possible to observe each fiber along at least one plane parallel thereto, second observation means making it possible to observe said respective ends of the fiber and the end of the core of each of these, a video monitor on the screen of which the images of the fibers and the images of the ends of said fibres and the respective cores thereof are intended to appear, and electronic image processing means able to plot and displace on the screen lines and contours of images located there;

so that this system makes it possible to move on the screen the contours of one of the fibers and the core thereof until the contour of said core is aligned with the contour of the core of the other fiber and then move said fibre until its image coincides with the corresponding contour.

According to a preferred embodiment of the inventive system, the first observation means are intended for the observation of each fiber along two planes perpendicular to one another and parallel to said fiber, the images of the fibers along the two planes then being intended to appear on the video monitor.

The first observation means can comprise:

two first magnification optics, whereof the optical axes are perpendicular to one another and to said direction, two optical reflection means, respectively associated with the first optics, a beam splitting means able to detect, via the reflection means, the images formed by the optics and transmit said images, and a video camera connected to the monitor and serving to observe the images transmitted by the beam splitter.

According to a particular embodiment of the inventive system, the second observation means comprise two second magnification optics, each of them being able to give an image of the end of one of the fibers.

Preferably, each second optics, which is associated with one of the fibers, is rendered integral with the means for holding the other fiber, and the optical axes of the second optics are parallel to said direction, located at identical distances from the fibers with which they are respectively rendered integral when placed in their holding means and disposed in such a way as to be on either side of the fibers when the latter are aligned.

This leads to the simplification of the use of the system according to the invention.

Finally, in a preferred embodiment, the displaceable holding means also rotates the fiber which it holds about the axis of said fiber for reasons indicated hereinbefore.

BRIEF DESCRIPTION OF THE DRAWINGS

The invention is described in greater detail hereinafter relative to non-limitative embodiments and with reference to the attached drawings, wherein show:

FIGS. 4, 5, 6, 7, 8, 9 and 10 Diagrammatically the different stages of a particular embodiment of the process of the invention, using the system shown in FIGS. 1 to 3.

DETAILED DESCRIPTION OF THE PREFERRED EMBODIMENTS

Figure 1:
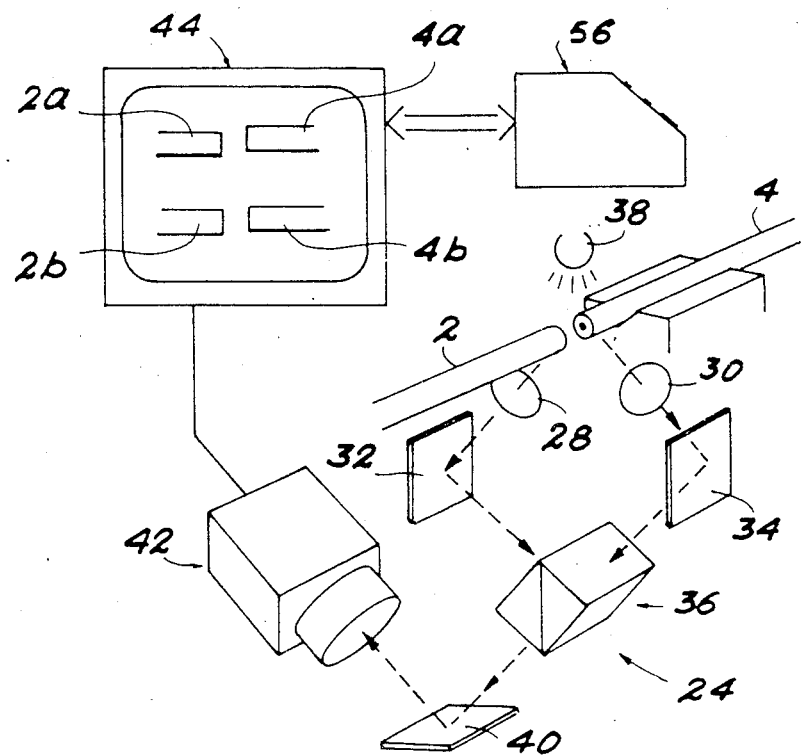
FIG. 1 A diagrammatic, partial perspective view of an embodiment of the system according to the invention.
Figure 2:
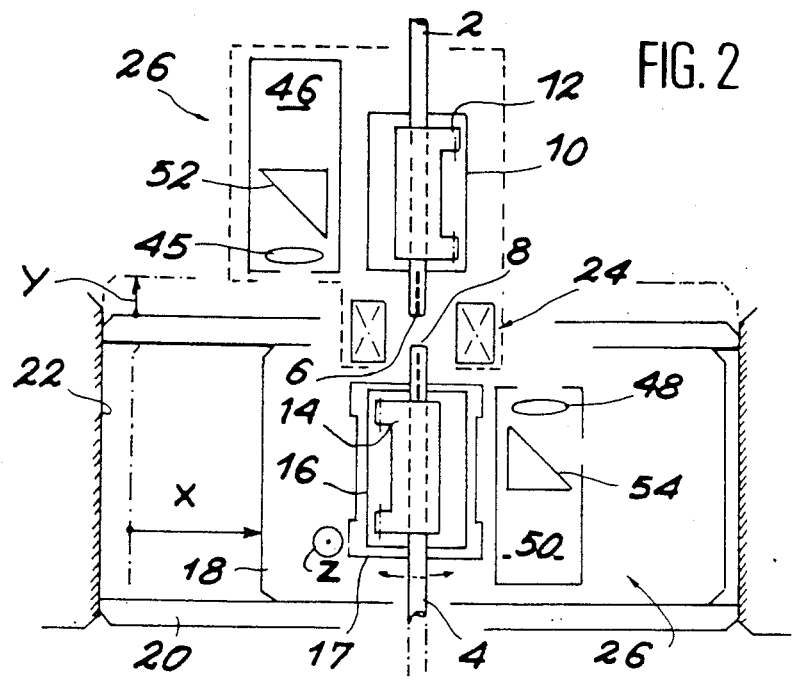
FIGS. 2 and 3 Diagrammatic, partial plan views corresponding to two states of the system shown in FIG. 1.
Figure 3:
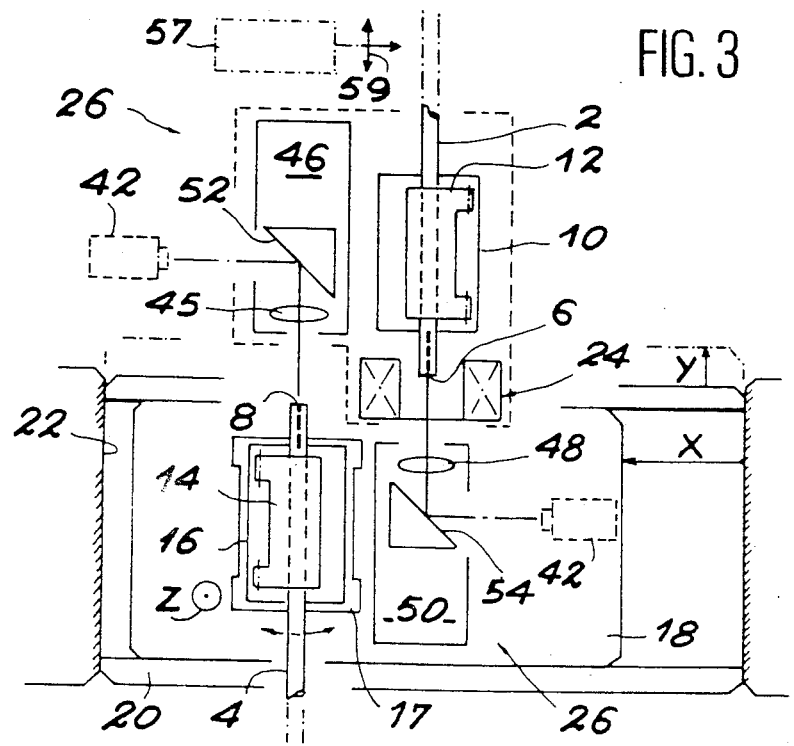

FIGS. 1 to 3 diagrammatically show a special embodiment of the system according to the invention intended for the optimum alignment of a first optical fiber 2 and a second optical fiber 4, e.g. of the single-mode type, whereby two respective ends 6, 8 of fibers 2, 4 are to be positioned facing one another.

The system shown in FIGS. 1 to 3 comprises a holding means 10, which is mounted on a support 12 and serves to hold fiber 2 oriented in a direction Y and a means 14 for holding fiber 4 in direction Y. Holding means 14 is mounted on a means able to rotate the fiber 4 about its axis and move said fiber 4 in a direction Z perpendicular to Y. This means comprises a support 16 rotating on another support 17, so that is permits the rotation of fiber 4 about its axis, the other support 17 being displaceable in translation in direction Z on a mounting plate 18. The latter is displaceable in translation in a direction X perpendicular to directions Y and Z on another mounting plate 20, which is itself displaceable in translation in direction Y with respect to a frame 22.

The system shown in FIGS. 1 to 3 also comprises first observation means 24 and second observation means 26 with respect to fibers 2 and 4.

The first observation means 24 comprise two magnification optics 28, 30, two e.g. plane mirrors 32, 34, as well as a beam splitter 36. As can be seen in FIGS. 1 to 3, optics 28, 30 are fixed with respect to the holding means 10, which is itself fixed and oriented in such a way that their optical axes are perpendicular to one another and located in a plane perpendicular to direction Y. Optics 28 and 30 are intended to give each of the fibers 2 and 4 substantially aligned by appropriate displacement of supports 17 and plates 18 and 20, two images with the same magnification, corresponding to the observation of said fiber in two planes perpendicular to one another and parallel to the fiber.

The respective images of fibers 2 and 4, appropriately illuminated by a light source 38 and which are formed by optics 28 (or 30) are transmitted to an e.g. plane mirror 40 via mirror 32 (respectively 34) and then splitter 36. These images, reflected by mirror 40, are observed by a displaceable video camera 42 and projected onto the screen of a video monitor 44, to which is connected camera 42.

Thus, on the screen of monitor 44 are observed two images 2a, 2b having the same magnification of fiber 2 or 4a and 4b of fiber 4, viewed along two planes perpendicular to one another and parallel to direction Y.

The second observation means 26 comprise a magnification optics 45 mounted on a support 46 fixed with respect to holding means 10 and a magnification optics 48 mounted on a support 50 fixed with respect to mounting plate 18.

Optics 45 or 48, combined with camera 42, is intended to give an image of end 8 or 6 of fiber 4 or 2 having the same magnification as the images formed by optics 28 and 30.

Moreover, optics 45 and 48 have optical axes which are respectively parallel to fibers 2 and 4 located in their holding means, positioned at identical distances from said fibers and disposed in such a way that they are located on either side of the fibers when the latter are aligned.

By performing an appropriate translation of plate 18, it is possible to position optics 45, 48 facing ends 8, 6 of fibers 4, 2 (FIG. 3).

Thus, it is possible to project onto the screen of monitor 44 the image of end 8 or 6 of fiber 4 or 2 observed, following reflection on a mirror 52 or 54, which is e.g.

a plane mirror, by camera 42 successively placed facing mirrors 52, 54, said mirrors being respectively fixed to supports 46, 50 and form angles of 45° with the axes of optics 45, 48.

The process according to the invention is performed in the following way with the system shown in FIGS. 1 to 3.

The first operation is to process images 2a, 2b of fibre 2, projected onto the screen of monitor 44 connected to electronic image processing means 56 (cf. FIG. 4 in which the images of fiber 4 are not shown). With the aid of these electronic image processing means 56, equipped a contour plotting program, respective geometrical contours Ca, Cb of images 2a, 2b are plotted (FIG. 5). Using the processing means 56, the respective longitudinal median axes Da, Db of contours Ca, Cb, as well as the median axis D parallel to axes Da and Db and equidistant therefrom are also plotted.

This is followed by the projection onto the screen of monitor 44 of the image 2c of a cross-section of fiber 2, obtained by observing the end 6 of said fiber, as indicated in the description of FIG. 3 and the contour C1 of said cross-section 2c is also plotted. By illuminating fiber 2 through its sheath (e.g. by means of a laser 57 associated with a focussing lens 59) at a distance of e.g. 30 to 50 cm from its end 6, it is possible to locate the core of fiber 2, whereof the image then appears on the screen of monitor 44 in the cross-section 2c of the fiber and whose contour C2 can consequently be plotted.

Using processing means 56, this is followed by a displacement on the screen of contours C1 and C2 until the center of C1 is located on axis D (FIG. 5), facing the images of the end of fiber 2.

As can be seen in FIG. 6, this is followed by turning down or rabatment operations, still using image processing means 56, in order to represent in their effective positions contours C2a and C2b of the core on images Ca and Cb. Account must be taken of the fact that contours Ca and Cb respectively correspond to views of optical fibre 2 in two perpendicular planes and it is necessary to plot the generatrixes required for the turning down operations by establishing correct correspondences between contours C1, C2, Ca and Cb.

As can be seen in FIG. 6, contour C2a can be obtained by extending those parts of contour Ca parallel to axis D from the side of contour C1, by plotting the tangents to said contour C1 which are perpendicular to axis D so as to encounter the aforementioned extensions, which defines a straight line D1. This is followed by effecting a projection of contour C2 on line D1 perpendicular to axis D and finally by plotting in the direction of Ca lines which pass through the ends of the projection obtained on D1 and which are parallel to axis D.

Contour C2b can be obtained by extending those parts of contour Cb which are parallel to axis D from the side of contour C1, by plotting the tangents to the latter which are parallel to axis D, by plotting a straight line D2 perpendicular to axis D and such that contours Ca, Cb and C1 are on the same side of said line D2 and by plotting two lines D3 and D4 perpendicular to one another and both forming an angle of 45° with axis D, from intersections I1, I2 of line D2 with the tangent to C1 and the extension of Cb furthest from one another. This is followed by a projection of C2 on D3 parallel to axis D and the thus obtained projection is turned down on D4 perpendicular to axis D and in the direction of Cb are plotted two lines parallel to axis D from the ends of the segment obtained in this way on D4, in order to obtain contour C2b.

It is then possible to erase the construction lines, as well as contours C1, C2 of the screen of monitor 44, whilst simply retaining thereon images 2a and 2b, contours Ca, Cb, C2a and C2b, as well as axes D, Da and Db (FIG. 7).

Figure 8:
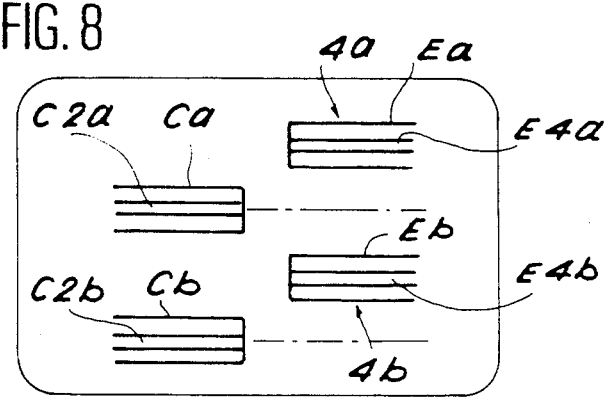

It is then possible to proceed with images 4a, 4b of fiber 4, as explained relative to the fiber 2, in order to obtain on the screen the respective contours Ea, Eb of images 4a, 4b, as well as the respective contours E4a, E4b of the core of fiber 4, in the effective position on images 4a, 4b (FIG. 8).

Figure 9:
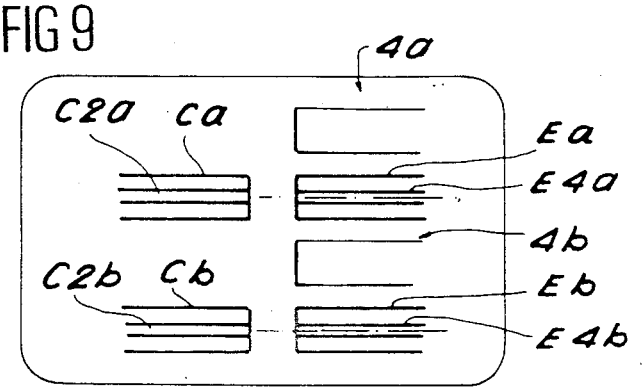

Contours Ea, E4a, Eb and E4b are then moved on the screen using electronic processing means 56, in such a way that the median axes of contours E4a and E4b of the core of fiber 4 are respectively aligned with the median axes of contours C2a, C2b of the core of fiber 2 (FIG. 9).

Figure 10:
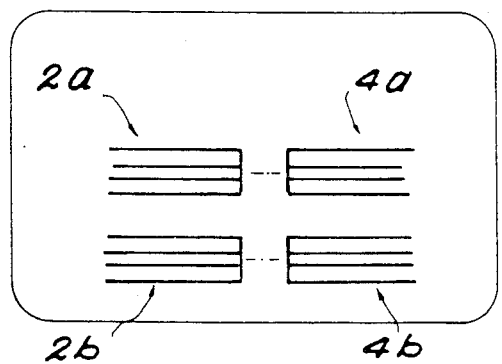

Finally, there is a real displacement of fiber 4 with the aid of the other support 17 and mounting plates 18, 20, in such a way that its images 4a, 4b perfectly coincide with their respective contours E4a, E4b (FIG. 10).

The fibres are then correctly aligned for establishing an optical link or connection between them. Thus, it is possible to connect these fibers to one another by a conventional welding process comprising the successive stages of advancing the fibers towards one another, followed by preheating, mutal penetration and the melting or sealing off of the ends of said fibers, the three latter stages being performed by means of an electric arc or a $CO_2$ laser.

Figure 11:
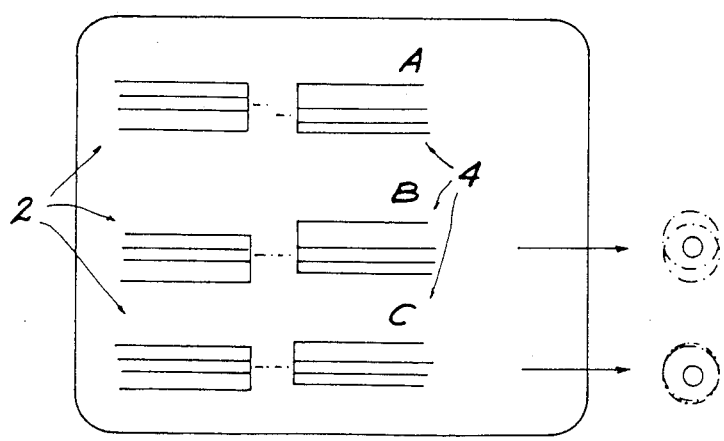
FIGS. 11 and 12 Diagrammatically a supplementary stage of said process making it possible to improve the alignment of the optical fibers formed.

In the case of two fibers 2, 4 having eccentric cores, their images on the monitor screen are as shown at A in FIG. 11. The overlap of the cross-section of these fibers through the process described hereinbefore is not of an optimum nature (B in FIG. 11), which is prejudicial to the mechanical strength of the fibers when splicing thereof takes place by melting.

The visual display of the contours of the cores of the fibers according to the present invention makes it possible to find the best compromise with regards to this overlap. Thus, it is necessary to rotate fiber 4 about its axis by a given angle until overlap optimization is brought about (C in FIG. 11). The optical coupling and mechanical strength of the subsequently formed weld are then of an optimum nature.

Figure 12:
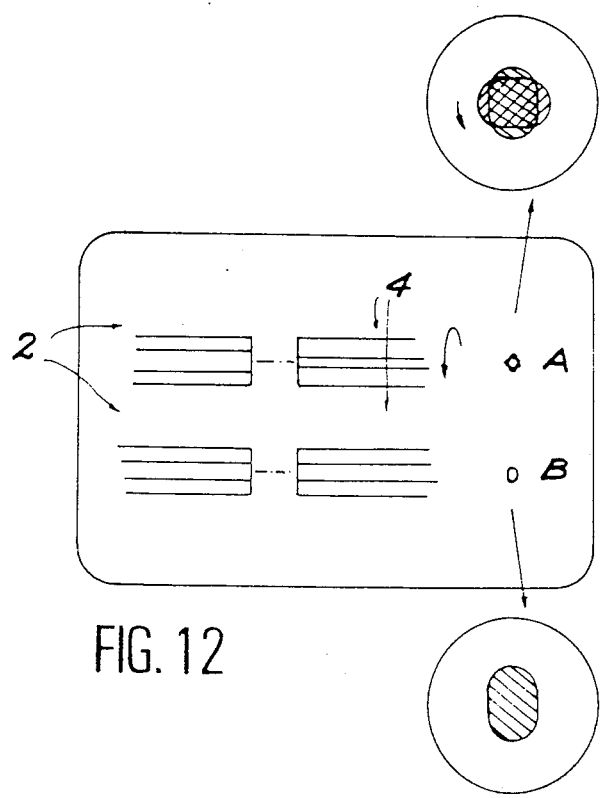

Thus, in the case of two fibers 2, 4, whose cores e.g. have an oval shape and which have been aligned by the above-described process (A in FIG. 12), it is possible to optimize the coupling obtained by rotating fiber 4 about its axis until there is an optimum overlap of the cross-sections of the cores of the two fibers 2, 4 (B in FIG. 12).

What is claimed is:

1. A process for the relative positioning of first and second optical fibers to establish an optical link between them respective ends of said fibers then being positioned facing one another said process comprising the following steps of:
   forming on a screen, for each fiber, at least one image of said fiber observed along at least one plane parallel thereto and representing on said image on said screen the contour of the core of the fiber, said contour being in its effective position,
   moving on the screen, the contours of the second fiber and of the core thereof until the contour of the core of said second fiber is aligned with the contour of the core of the first fiber, and displacing the second fiber until its image coincides with the corresponding contour.

2. A process according to claim 1, wherein it includes:
forming on the screen for each optical fiber, images of the said fiber observed along two planes perpendicular to one another and parallel to the fiber, and representing on each of these images on the screen the contour of the fiber core, said contour being in its effective position,
moving on the screen the contours of the second fiber and of the core thereof until the contours of the core of said second fiber are respectively aligned with the corresponding contours of the core of the first fiber, and
displacing the second fiber until its images coincide with the corresponding contours.

3. A process according to claim 2, wherein for each fiber, the contour of the core thereof on each image is represented by firstly forming on the screen an image, with the same magnification, of the cross-sections of the fiber and of the core thereof, by then displacing the contours of these cross-sections until the contour of the core cross-section is on the straight line which is equidistant of the respective median axes of the contours of the fiber and then carrying out rabatments on the screen, to arrive at the core contour in its effective position.

4. A process according to claim 1, wherein after displacement step relative to the second fiber, the two fibers then facing one another, a relative axial rotation of said fibers is carried out in order to increase the overlap of the cross-sections of the fibres and/or cores thereof, said cross-sections facing one another.

5. A process according to claim 3, wherein the image of the cross-section of the fiber core is formed on the screen by means of an illumination of the fiber through its sheath at some distance from the fiber end.

6. A system for the relative positioning of two optical fibers with a view to forming an optical link between them, respective ends of said fibers then being positioned facing one another, said system comprising:
fiber holding means, able to keep the fibers oriented along a given direction, whereby at least one of the holding means is displaceable,
first observation means making it possible to observe each fiber along at least one plane parallel thereto,
second observation means making it possible to observe said respective ends of the fiber and the end of the core of each of these fibers,
a video monitor on the screen of which the images of the fibers and the images of the ends of said fibers and of the respective cores thereof are intended to appear, and electronic image processing means able to plot and displace on the screen lines and contours of images located there, so that this system makes it possible to move on the screen the contours of one of the fibers and of the core thereof until the contour of said core is aligned with the contour of the core of the other fiber and then to displace said one of the fibers until its image coincides with the corresponding contour.

7. A system according to claim 6, wherein the first observation means are observes each fiber along two planes perpendicular to one another and parallel to said fiber, the images of the fibers along the two planes then appearing on the video monitor.

8. A system according to claim 7, wherein the first observation means comprise:
two first magnification optics, whereof the optical axes are perpendicular to one another and to said given direction,
two optical reflection means, respectively associated with the first optics,
a beam splitting means able to detect, via the reflection means, the images formed by the optics and transmit said images, and
a video camera connected to the monitor and serving to observe the images transmitted by the beam splitter.

9. A system according to claim 6, wherein the second observation means comprise two, second magnification optics, each of them being provided for giving an image of the end of one of the fibers.

10. A system according to claim 9, wherein each second optics, which is associated with one of the fibers, is rendered integral with the means for holding the other fiber, and wherein the optical axes of the second optics are parallel to said given direction, located at identical distances from the fibers with which they are respectively rendered integral when said fibers are placed in their holding means, and disposed in such a way as to be on either side of the fibers when the latter are aligned.

11. A system according to claim 6, wherein the displaceable holding means is also provided for rotating the fiber which it holds about the axis of said fiber.

* * * * *

UNITED STATES PATENT AND TRADEMARK OFFICE
CERTIFICATE OF CORRECTION

PATENT NO. : 4,825,092

DATED : April 25, 1989

INVENTOR(S) : Kada Mehadji

It is certified that error appears in the above-identified patent and that said Letters Patent is hereby corrected as shown below:

Column 3, line 10, delete "fibre" and insert --fiber--.

Column 5, line 13, after "equipped" insert --with--.

Column 8, line 34, delete "6" and insert --7--.

Column 8, line 35, after "two" delete --,--.

Signed and Sealed this

Twelfth Day of December, 1989

*Attest:*

JEFFREY M. SAMUELS

*Attesting Officer*        *Acting Commissioner of Patents and Trademarks*